United States Patent [19]

Iwashita et al.

[11] Patent Number: 5,388,184
[45] Date of Patent: Feb. 7, 1995

[54] CARDINAL NUMBER EXTENDING CIRCUIT FOR FUZZY NEURON

[75] Inventors: Kouichi Iwashita; Masanari Oh, both of Fukuoka, Japan

[73] Assignee: Rohm Co., Ltd., Kyoto, Japan

[21] Appl. No.: 994,325

[22] Filed: Dec. 21, 1992

[30] Foreign Application Priority Data

Dec. 28, 1991 [JP] Japan .................. 3-359884

[51] Int. Cl.$^6$ ............................................. G05B 11/00
[52] U.S. Cl. ........................................ 395/3; 395/900
[58] Field of Search ................. 395/3, 24, 27, 900, 395/61

[56] References Cited

U.S. PATENT DOCUMENTS

| | | | |
|---|---|---|---|
| 4,361,907 | 11/1982 | Wine | 455/160 |
| 4,718,097 | 1/1988 | Uenoyama | 395/2.19 |
| 5,131,071 | 7/1992 | Tsutsumi et al. | 395/900 |
| 5,185,849 | 2/1993 | Miyazawa et al. | 395/3 |

OTHER PUBLICATIONS

"A Fuzzy Neuron Chip and Its Application to a Pattern Recognition System" IFSA '91 Brussels.

*Primary Examiner*—Allen R. MacDonald
*Assistant Examiner*—Stuart B. Shapiro
*Attorney, Agent, or Firm*—Oliff & Berridge

[57] ABSTRACT

A Cardinal number extending circuit for varying a resolution of input signals within a fuzzy neuron includes a plurality of computing blocks, each of the computing blocks having a different one of a plurality of resolution levels with each of the resolution levels represented by a Cardinal number. The Cardinal number for an n-th one of said computing blocks is $2^{n-1}k$, where k is a number corresponding to a base resolution level. A switch responsive to an external selection signal selects a computing block corresponding to one of the Cardinal numbers to generate a computed result having one of the resolution levels. The Cardinal number extending circuit may alternatively include a Cardinal number extending block defined by a plurality of circuits receiving input signals, the circuits integrating the input signals with a plurality of integrating levels arranged in a tournament configuration and a switch for selecting and outputting a computed value from any one of the integrating levels having a desired resolution level.

5 Claims, 3 Drawing Sheets

CARDINAL NUMBER EXTENDING CIRCUIT FOR FUZZY NEURON

BACKGROUND OF THE INVENTION

1. Field of the Invention

The present invention relates to a circuit for realizing a hardware circuit for recognition of patterns containing equivocation information.

2. Description of the Prior Art

The fuzzy neuron makes a pattern recognition with respective grades of patterns determined by comparing and collating between the output of a sensor on a feature extracting line and the membership function of each of the preset patterns using the minimum and maximum value calculations. The details of the fuzzy neuron are described in Yamakawa, "A Fuzzy Neuron Chip and Its Application to a Pattern Recognition System", IFSA'91, 1991 and Japanese Patent Application entitled "Fuzzy Neuron" filed by Takeshi Yamakawa on May 26, 1989.

In the fuzzy neuron, the recognition is performed by extracting the feature of a pattern from a feature extracting line and recognizing the extracted information. The feature extracting line is divided into parts, the number of divided parts representing the resolution of the feature extracting line and being known as a Cardinal number (k).

When the fuzzy neuron theory is realized by hardware, the latter is generally classified into two types, serial type and parallel type. The serial type hardware is simple in circuit and has an increased degree of freedom although the computing speed is slower. On the other hand, the parallel type hardware is difficult to extend with a fixed Cardinal number although the computing speed is faster.

In a field requiring increase in the computing speed, thus, the parallel type hardware is preferably used.

The necessary Cardinal number is different from one pattern to be recognized to another. In order to realize a general-purpose fuzzy neuron hardware, the Cardinal number is required to be variable depending on an object to be recognized.

If the general-purpose fuzzy neuron is to be realized according to the prior art as a parallel type hardware, the Cardinal number cannot be variable and extended since it is fixed by the fact that computing blocks corresponding to the respective feature extracting lines are parallel to and independent of each other.

SUMMARY OF THE INVENTION

It is therefore an object of the present invention to provide a parallel type fuzzy neuron hardware which can be actuated at higher speeds and which comprises means for rendering the Cardinal number variable.

To this end, the present invention provides a Cardinal number extending circuit for a fuzzy neuron, which comprises a plurality of computing blocks each of the computing blocks having a different one of a plurality of resolution levels, each of the resolution levels represented by a Cardinal number, the Cardinal number for an n-th one of the computing blocks being $2^{n-1} \times k$, where k is a number corresponding to a base resolution level and means responsive to an external selection signal for selecting one of the computing blocks corresponding to one of the Cardinal numbers.

The fuzzy neuron hardware of the present invention is further characterized by a Cardinal number extending block which comprises means for integrating basic blocks corresponding to the minimum Cardinal number into a tournament configuration and for outputting a computed value for each integrating step.

When one of the computing blocks of n in number which have different Cardinal numbers is selected by an external signal as shown in FIG. 1, the result of the objective computing block can be outputted. As a result, the Cardinal number of the object to be recognized can be selected to perform the objective recognition and computation. Further, the hardware can be simplified since the computing blocks can be used together by providing the tournament system of computing blocks as basic units, as shown in FIG. 2.

DETAILED DESCRIPTION OF THE PREFERRED EMBODIMENTS

Figure 1:
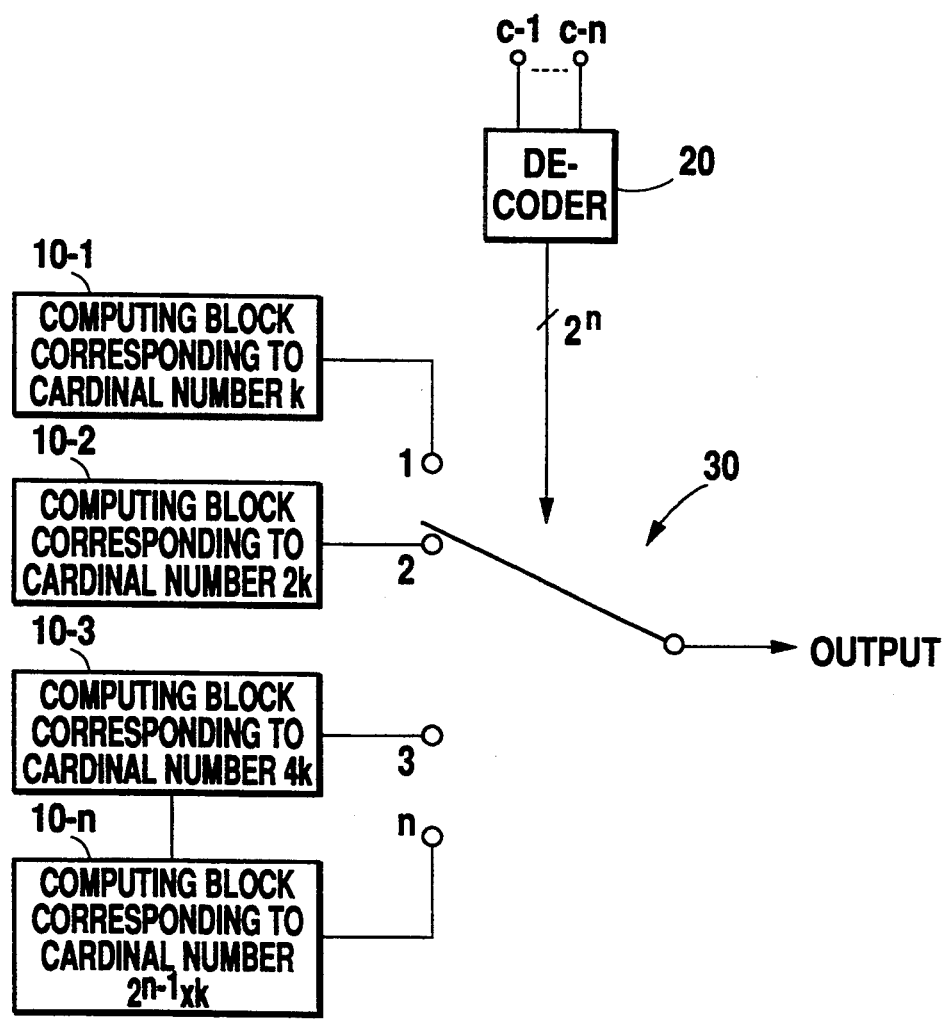
FIG. 1 is a block diagram of means for switching between computing blocks having different Cardinal numbers in accordance with the present invention.
Figure 2:
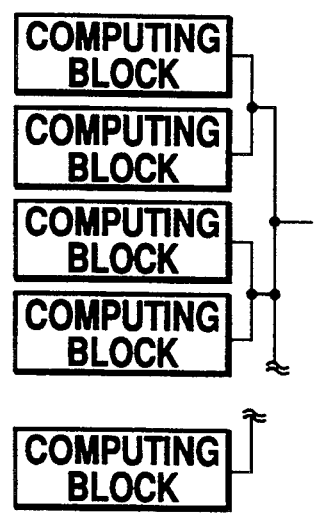
FIG. 2 is a block diagram of computing blocks arranged into a tournament configuration in accordance with the present invention.

Referring first to FIG. 1, each of the computing blocks 10-1 to 10-N has a plurality of inputs (not shown). The computing blocks 10-1 to 10-N may be a circuit similar to the one shown within the dotted line of FIG. 3. There is shown a Cardinal number extending switch constructed in accordance with the present invention, which comprises computing blocks or circuits 10-1 to 10-n (n=1, 2, ...) each having different resolution levels corresponding to extended Cardinal numbers, the Cardinal number for an n-th one of the computing blocks being $2^{n-1} \times k$, where k is a number corresponding to a base resolution level, a decoder 20 having signal terminals connected to external selection signal terminals $C_1-C_n$ of n in number and adapted to generate Cardinal number selection signals of $2^n$ in number, and a switch 30 responsive to a Cardinal number selection signal from the decoder for selecting one of the computed values. When the switch is placed on the side "1" by the output signal (Cardinal number selection signal) of the decoder 20, the computing block 10-1 corresponding to the Cardinal number k will externally output a computed value. When the switch is shifted to the side "2", the computing block 10-2 corresponding to the Cardinal number 2k will externally output a computed value. When the switch is shifted to the side "3" or any subsequent side, the computing block corresponding to the respective one of the Cardinal numbers will similarly output a computed value. The Cardinal number extending switch 30 may be defined by, for example, CMOS. The computing blocks may be various types of circuits.

Figure 3:
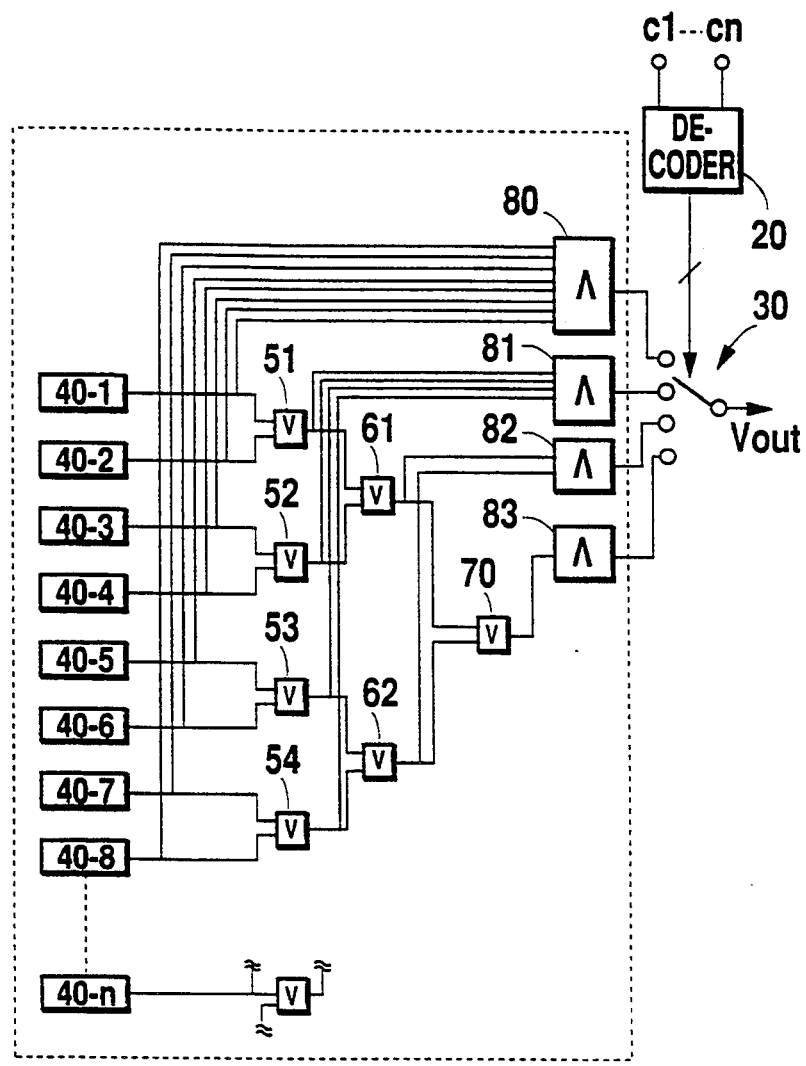
FIG. 3 is a block diagram of another embodiment of the present invention.

FIG. 3 shows another embodiment of the present invention which comprises computing blocks 40-1, . . . and 40-n defining basic computing blocks, maximum value comparing and computing circuits 51-54, . . . 61, 62, . . . 70 for integrating the computing blocks into a tournament configuration (maximum value computation) and for outputting a computed value (corresponding to the Cardinal number) for each integrating level, minimum comparing and computing circuits 80-83 each for computing the minimum value of that computed value for each Cardinal number (k, 2k, 4k, ... $2^{n-1} \times k$ (n=1, 2, ...)) and a Cardinal number selection switch 30 for outputting one of the computed results.

Each of the computing blocks 40-1, ... 40-n of n in number corresponds to one feature extracting line. Therefore, the minimum value computing circuits 80-83 will receive tournament-shaped integrated outputs which correspond to the respective Cardinal numbers (k, 2k, 4k, ... $2^{n-1} \times k$ (n=1, 2, ...)). More particularly, the minimum value computing circuit 80 having its Cardinal number k receives all the computed values of the computing blocks 40-1, ... 40-n. The minimum value computing circuit 81 having its Cardinal number 2k receives the computed result of the maximum value computing circuit 51 integrating the computing blocks 40-1 and 40-2, the computed result of the maximum value computing circuit 52 integrating the computing blocks 40-3 and 40-4, the computed result of the maximum value computing circuit 53 integrating the computing blocks 40-5 and 40-6 and the computed result of the maximum value computing circuit 54 integrating the computing blocks 40-7 and 40-8. The minimum value computing circuit 82 having its Cardinal number 4k receives the computed result of the maximum value computing circuit 61 integrating the computing blocks 40-1, 40-2, 40-3 and 40-4 and the computed result of the maximum value computing circuit 62 integrating the computing blocks 40-5, 40-6, 40-7 and 40-8. The minimum value computing circuit 83 having its Cardinal number 8k receives the computed result of the maximum value computing circuit 70 integrating the computing blocks 40-1, ... 40-8. The minimum value computing circuit having its Cardinal number $2^{n-1} \times k$ similarly receives the computed result of the corresponding maximum value computing circuit.

Each of the computed results is used as an input signal for switching the switch 30 from one place to another. As a result, one of the computed results will be outputted externally. The switching is accomplished by using a decoder 20 responsive to input signals through external selection signal terminals $C_1 - C_n$ of n in number for generating Cardinal number selection signals of $2^n$ in number.

We claim:

1. A resolution varying circuit for varying a resolution of input signals within a fuzzy neuron, comprising:
    a plurality of computing circuits receiving the input signals, each of said computing circuits having a different one of a plurality of integrating levels, each of the integrating levels having a different one of a plurality of resolution levels, the resolution level for an n-th one of said computing circuits being $2^{n-1} \times k$, where k is a number corresponding to a base resolution level and n is an integer in a range between 1 and a number of said computing circuits, each of said computing circuits varying the input signals and outputting a computed result having a corresponding one of said resolution levels; and
    means responsive to an external selection signal for selecting an output of one of said plurality of computing circuits based on a desired resolution level to output the computed result.

2. A resolution varying circuit for varying a resolution of input signals within a fuzzy neuron, comprising:
    integrating means for integrating said input signals with a plurality of integrating levels arranged in a tournament configuration, each of said integrating levels having a different one of a plurality of resolution levels; and
    output means for selecting and outputting an output of any one of said integrating levels having a desired one of said resolution levels.

3. The resolution varying circuit of claim 2, wherein said integrating means comprises:
    a plurality of maximum value comparing and computing circuits arranged in said integrating levels, each of said maximum value comparing and computing circuits having a plurality of inputs and an output, the inputs of each of the maximum value comparing and computing circuits of a first one of said integrating levels receiving the input signals and each of the inputs of the maximum value comparing and computing circuits of succeeding ones of said integrating levels connected to the outputs of a plurality of the maximum value comparing and computing circuits of preceding ones of said integrating levels.

4. The resolution varying circuit of claim 3, wherein the integrating means comprises a plurality of minimum value comparing and computing circuits each having a plurality of inputs and an output, the inputs of a first one of said minimum value comparing and computing circuits receiving the input signals and the inputs of each of successive ones of said minimum value comparing and computing circuits connected to the outputs of said maximum value comparing and computing circuits of succeeding ones of said integrating levels.

5. The resolution varying circuit of claim 4, wherein said output means comprises a decoder responsive to an external selection signal for selecting the output of one of said minimum value comparing and computing circuits to generate a result having one of said resolution levels.

* * * * *